US010228259B2

(12) United States Patent
Myers et al.

(10) Patent No.: US 10,228,259 B2
(45) Date of Patent: Mar. 12, 2019

(54) SYSTEMS, METHODS, AND DEVICES FOR COMMUNICATING DRIVE HISTORY PATH ATTRIBUTES

(71) Applicant: Ford Global Technologies, LLC., Dearborn, MI (US)

(72) Inventors: Scott Vincent Myers, Camarillo, CA (US); David A Herman, Southfield, MI (US)

(73) Assignee: FORD GLOBAL TECHNOLOGIES, LLC., Dearborn, MI (US)

(*) Notice: Subject to any disclaimer, the term of this patent is extended or adjusted under 35 U.S.C. 154(b) by 0 days.

(21) Appl. No.: 15/835,822

(22) Filed: Dec. 8, 2017

(65) Prior Publication Data

US 2018/0106631 A1    Apr. 19, 2018

Related U.S. Application Data

(63) Continuation-in-part of application No. 15/788,500, filed on Oct. 19, 2017, which is a continuation of
(Continued)

(51) Int. Cl.
| | |
|---|---|
| *G01C 21/34* | (2006.01) |
| *B60Q 1/08* | (2006.01) |
| *B60W 30/14* | (2006.01) |
| *B60W 40/072* | (2012.01) |
| *B60W 40/076* | (2012.01) |
| *G05D 1/02* | (2006.01) |
| *B62D 15/02* | (2006.01) |
| *B60W 50/14* | (2012.01) |
| *B60W 30/12* | (2006.01) |

(52) U.S. Cl.
CPC ......... *G01C 21/3484* (2013.01); *B60Q 1/085* (2013.01); *B60W 30/12* (2013.01); *B60W 30/14* (2013.01); *B60W 40/072* (2013.01); *B60W 40/076* (2013.01); *B60W 50/14* (2013.01); *B62D 15/025* (2013.01); *B62D 15/029* (2013.01); *B62D 15/0285* (2013.01); *G01C 21/3415* (2013.01); *G05D 1/0274* (2013.01); *B60W 2550/142* (2013.01); *B60W 2710/30* (2013.01); *B60W 2720/10* (2013.01); *G05D 2201/0213* (2013.01)

(58) Field of Classification Search
CPC ... G01C 21/3484; B60Q 1/085; B60W 30/12; B60W 30/14; B60W 40/072; B60W 40/076
USPC ........................................................ 701/411
See application file for complete search history.

(56) References Cited

U.S. PATENT DOCUMENTS

| 8,577,596 B2 | 11/2013 | Stählin |
| 8,744,675 B2 | 6/2014 | King |

(Continued)

*Primary Examiner* — Yazan A Soofi
(74) *Attorney, Agent, or Firm* — David R. Stevens; Stevens Law Group (57) ABSTRACT

A method for providing path attributes to controllers in a vehicle includes receiving drive history data for a future driving path of the vehicle, wherein the drive history data comprises a first data format. The method includes generating a message for a controller comprising path attributes from the drive history data according to a subscription list, wherein the message comprises a controller data format based on an indication by the subscription list. The method further includes providing one or more data packets comprising the message to the controller.

20 Claims, 7 Drawing Sheets

Related U.S. Application Data application No. 15/076,046, filed on Mar. 21, 2016, now Pat. No. 9,846,050.

(56) References Cited

U.S. PATENT DOCUMENTS

| | | | |
|---|---|---|---|
| 9,047,774 B2* | 6/2015 | Tseng | G08G 1/0112 |
| 2005/0256639 A1* | 11/2005 | Aleksic | G01C 21/3415 |
| | | | 701/414 |
| 2010/0036601 A1* | 2/2010 | Ozawa | G01C 21/00 |
| | | | 701/465 |
| 2010/0106603 A1* | 4/2010 | Dey | G01C 21/3484 |
| | | | 705/14.63 |
| 2013/0024104 A1 | 1/2013 | Stählin | |
| 2013/0158794 A1 | 6/2013 | Wilson | |
| 2014/0278070 A1* | 9/2014 | McGavran | G01C 21/00 |
| | | | 701/465 |
| 2015/0276419 A1* | 10/2015 | Hashem | G01C 21/20 |
| | | | 701/425 |
| 2015/0292893 A1* | 10/2015 | Bartsch | G01C 21/34 |
| | | | 701/408 |
| 2015/0300825 A1 | 10/2015 | Manoliu | |

* cited by examiner

SYSTEMS, METHODS, AND DEVICES FOR COMMUNICATING DRIVE HISTORY PATH ATTRIBUTES

CROSS-REFERENCE TO RELATED APPLICATIONS

This application is a continuation-in-part and claims the benefit of U.S. application Ser. No. 15/076,046, filed Mar. 21, 2016, entitled "Systems, Methods, And Devices For Communicating Drive History Path Attributes," and U.S. application Ser. No. 15/788,500, filed Oct. 19, 2017, entitled "Systems, Methods, And Devices For Communicating Drive History Path Attributes," which are hereby incorporated by reference herein in their entireties, including but not limited to those portions that specifically appear hereinafter, the incorporation by reference being made with the following exception: In the event that any portion of the above-referenced applications is inconsistent with this application, this application supersedes said portion of said above-referenced applications.

TECHNICAL FIELD

The disclosure relates generally to methods, systems, and apparatuses for communicating drive history path attributes to a controller.

BACKGROUND

Automobiles provide a significant portion of transportation for commercial, government, and private entities. Due to the high value of automobiles and potential harm to passengers and drivers, driver safety and avoidance of collisions, accidents, or other damage to vehicles are extremely important. In order to have more detailed information about a section of roadway or other driving environment, some vehicles may store drive histories, which include detailed information gathered by sensors for later recall when traversing the same roadways.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Attributed predicted paths for vehicles provide information about a roadway or a driving path ahead of a vehicle based on electronic map data. For example, attributed predicted paths may be able to provide information about road curvature, tilt of a roadway, or a plurality of other details. This information may be used by a human driver or an automated driving system to safely, efficiently, and accurately drive the car along a desired path. The Advanced Driver Assistance Systems Interface Specification (ADASIS) provides standards for attributed predicted path provider operation to allow interconnection of driver assistance systems (or automated driving systems) from different providers or companies. The different components, may then be able to communicate with each other over a controller area network (CAN) bus. For example, sensors or data sources may publish data to the CAN bus while controllers of various systems may be able to access that data for processing in controlling the vehicle and/or providing assistance to a human driver.

However, ADASIS Horizon or attributed predicted path information (or data available in a map) may be limited in the amount of detail that is available. In some cases, additional detail may be available for paths previously traveled by a driver or vehicle in a drive history. However, getting drive history information to the applications or controllers is currently very inefficient and difficult. For example, drive history knowledge, when used, is communicated to other controllers using one-to-one communication protocols. Thus, separate messages must be sent to each controller and each controller may require data or messages in different formats or use different protocols.

Applicant has developed systems, methods, and devices that provides significant improvements to existing drive history and ADASIS Horizon or attributed predicted path providers. According to one embodiment, a method for providing drive history information includes determining a location of a vehicle and determining a future driving path for the vehicle. The method also includes determining, based on a drive history for the vehicle or a driver of the vehicle, drive history path attributes for the future driving path. The method includes providing the drive history path attributes to a plurality of controllers via a controller bus. The drive history path attributes are provided to the plurality of controllers using a common protocol.

In one embodiment, drive history information may be provided to controllers on a bus over a controller bus (such as a CAN bus). In one embodiment, Applicant proposes modifications of or additions to the ADASIS standard to include a common protocol allowing a drive history provider to broadcast path attributes to all other controllers on the bus. For example, the ADASIS standard may be modified to allow path attributes from a drive history provider to be published to the CAN bus and allow path attributes from an ADASIS Horizon or attributed predicted path provider to be published on the CAN bus. In one embodiment, each reconstructor (such as a controller listening on the bus) would recreate a small subset of the path database for specific uses, needs or applications of the controller. For example, the controllers may use or implement a myriad of applications and may include, but are not limited to, an adaptive cruise control, an energy management controller, a curve warning controller, a headlight controller, a lane departure warning system, a hill power train optimization controller, a driver notification system, an automated driving system, and/or a driver assistance system. An adaptive cruise may adapt a controlled speed of the vehicle based on traffic, road geometry or other environmental factors. An energy management controller may manage speed or vehicle accessory systems (such as heating or cooling) based on predicted incline, decline, or the like of a roadway. A curve warning controller may control a notification system to warn of the presence, severity, or curvature of one or more upcoming turns or curves in a roadway. A headlight controller may control a direction of light cast by a headlight to cover the roadway even when the roadway is curvy. A lane departure warning system may give a warning when the vehicle departs from a lane on the roadway. A hill power train optimization controller may control a power train, including a gear and/or rotation speed of a motor or engine to optimize power usage. A driver notification system may provide notifications to a driver of a suggested speed for a current roadway, curve, or a vehicle maneuver. In one embodiment, controllers may both receive from and provide data to the controller bus.

In one embodiment, a system may learn new routes as well as route attributes while a vehicle is being driven. For example, as a driver drives a vehicle to a destination, sensors of the system may log route attributes or other detailed information about the route, which may be recalled later. When the same route is being traveled again, the vehicle or system may recognize that this route has been traveled before and pull up the route attributes or other detailed information to help with navigation or any other driver assistance or automated driving task.

In one embodiment, the recalled path attributes may be used to construct and project a forward path. For example, the details of the forward path may be assembled into a matrix or other representation of the path in front of the vehicle to allow a driver or other system to anticipate features or attributes of the road or path ahead. The amount of the path to project may be based on a current speed of the vehicle or a current speed limit for the roadway on which a vehicle is being driven. As the vehicle moves along the path, additional path attributes may be provided (e.g., over a CAN bus) so that there is always some information about the pathway ahead. In one embodiment, a system may re-project the forward path when the previous projection has been nearly traversed.

If a vehicle does not follow the projected path or a predicted driving route, a system may flush or discard the published path attributes. For example, if a vehicle turns off the predicted path the path attributes may not apply to the new route and may be discarded using CAN bus messages similar to those described in the ADASIS protocol. If available, path attributes for the new path may be determined and projected upon transition to the new path. If the path is unknown or does not have correlated information in a drive history, the forward path may be projected as well as possible with data from an electronic map or ADASIS Horizon or attributed predicted path provider.

Figure 1:
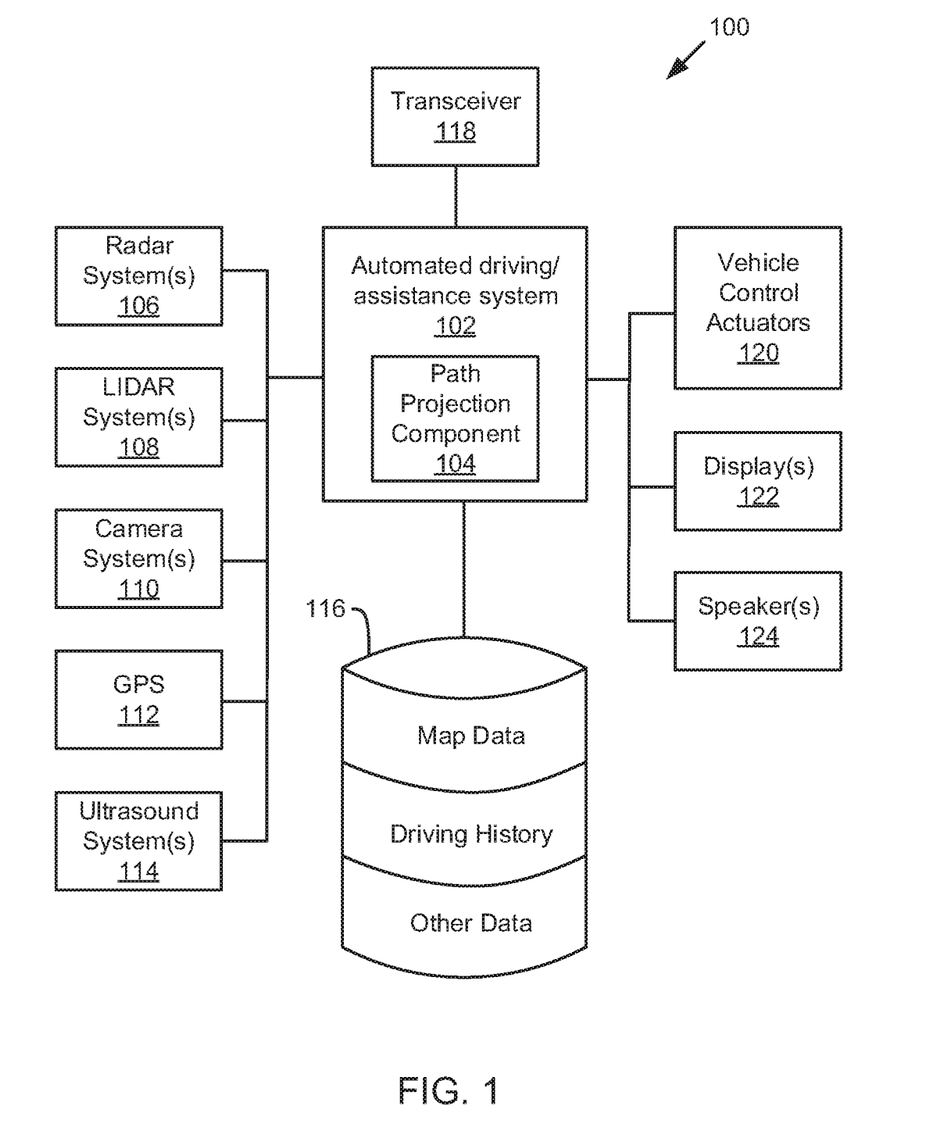
FIG. 1 is a schematic block diagram illustrating an implementation of a vehicle control system that includes an automated driving/assistance system.

Referring now to the figures, FIG. 1 illustrates an example vehicle control system 100 that may be used for assisting a human driver or performing automated driving. The vehicle control system 100 may comprise an automated driving/ assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/ assistance system 102 may include a path projection component 104 that provides information about path attributes to a human driver, one or more driving control systems, or other controllers that control any aspect of automated driving or driver assistance.

The vehicle control system 100 also includes one or more sensor systems/devices for detecting a presence of nearby objects, lane markers, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The vehicle control system 100 may include a data store 116 for storing relevant or useful data for navigation and safety such as map data, a driving history (i.e., drive history), or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. The automated driving/ assistance system 102 may implement one or more algorithms, applications, programs, or functionality that drive or assist in driving of the vehicle.

In one embodiment, the camera systems 110 may include a plurality of cameras. For example, the camera systems 110 may include cameras facing in different directions to provide different views and different fields of view for areas near or around the vehicle. For example, some cameras may face forward, sideward, rearward, at angles, or in any other direction.

Figure 2:
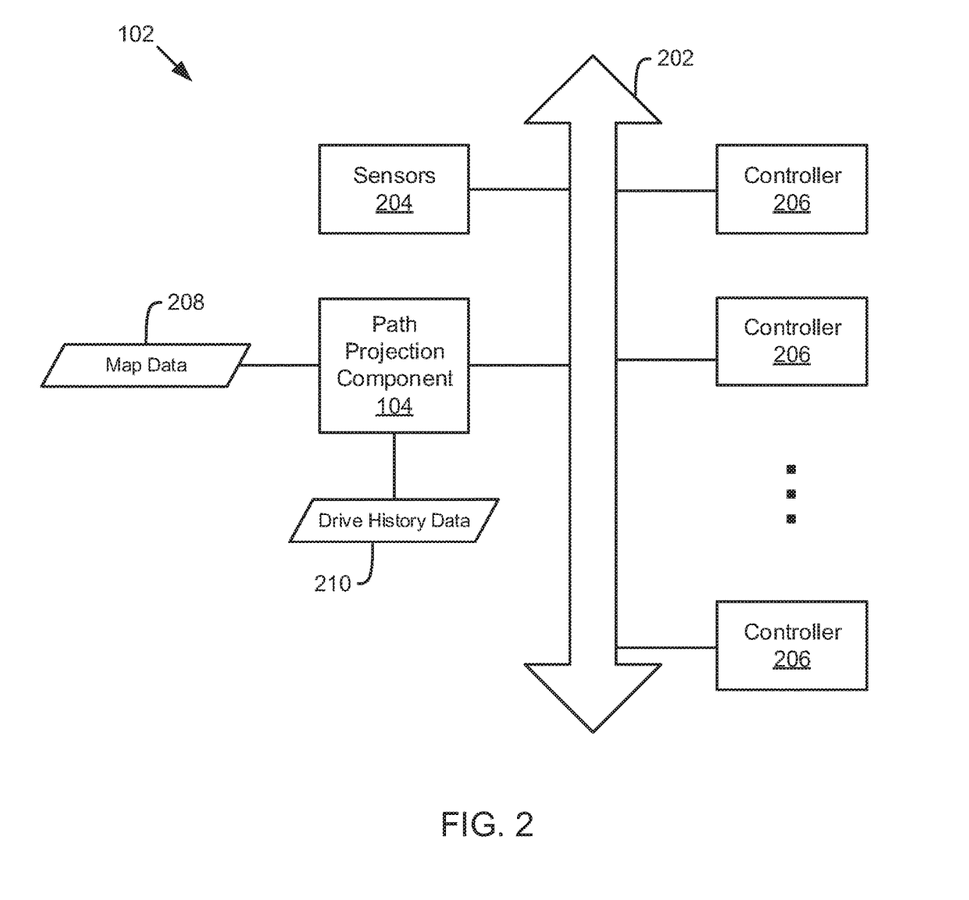
FIG. 2 is a schematic block diagram illustrating an automated driving/assistance system, according to one implementation.

FIG. 2 is a schematic block diagram illustrating an automated driving/assistance system 102. The automated driving/assistance system 102 includes a controller bus 202, one or more sensors 204, a plurality of controllers 206, and a path projection component 104. As will be understood by one skilled in the art, additional or fewer components may be included in the automated driving/assistance system 102, without limitation.

The controller bus 202 may provide a communication medium for receiving and sending messages or data. In one embodiment, the controller bus 202 may include a processor and data storage for storing data and/or retrieving data. For example, the controller bus 202 may store messages or data published on the bus, which can then be accessed or requested by another component on the bus. In one embodiment, the controller bus 202 includes a CAN bus as described by an ADASIS specification.

The sensors 204 may include any sensors or data sources that can provide data used by the controllers 206 or path projection component 104. For example, one or more of a radar system 106, LIDAR system 108, camera system 110, GPS 112, ultrasound system 114, or data store 116 may publish data to the controller bus 202 for use by the controllers and/or the path projection component 104. The path projection component 104 may determine path attributes for a path to be traveled by a vehicle and/or provide path attributes for a path to be traveled by a vehicle to the controller bus. The path projection component 104 may determine the path attributes based on map data 208 (e.g., from an electronic map or an ADASIS Horizon or attributed predicted path provider) and/or drive history data 210 (e.g., from a drive history specific to paths or locations already traveled by the driver and/or vehicle) so that aspects of the future roadway not yet detectable by the sensors 204 may be accounted for in advance. The path attributes may correspond to a section of a future path that is immediately ahead of the vehicle and that may be used by the controllers 206 to perform driver assistance or automated driving tasks. The controllers may include physical controllers and/or logical controllers that provide physical actuation or control signals for various aspects of a vehicle, such as of the vehicle control system 100 of FIG. 1. Example driver assistance or automated driving tasks performed by the controllers 206 may include, by way of example, driver notifications, drive train or suspension adjustments, speed adjustments, object or pedestrian detection, localization within a roadway, driving path generation for the current route (e.g., where on a roadway to position the vehicle), or the like.

The system 102 may communicate over an automotive Ethernet such as an Ethernet-based network for connection between in-vehicle electronic systems. An automotive Ethernet may include a physical network used to connect components within a car using a wired network. The automotive Ethernet may be customized to meet the electrical requirements, bandwidth requirements, latency requirements, and synchronization and network management requirements of the vehicle. An automotive Ethernet may further reduce the weight of the vehicle by eliminating or reducing the traditional vehicle harness wiring and simplifying the system. In an embodiment, the system 102 uses an automotive Ethernet comprising a common clock between, for example, the controllers 206, the sensors 204, and the controller bus 202. The common clock may use a transmit schedule granting a window of opportunity for communication between components based on the common clock. The communications may be scheduled and the automotive Ethernet may permit the transfer of large data files, such as data files including 100 Mb. That is, the common clock provides for a burst including a single message encompassing a larger data packet than traditional systems.

Figure 3:
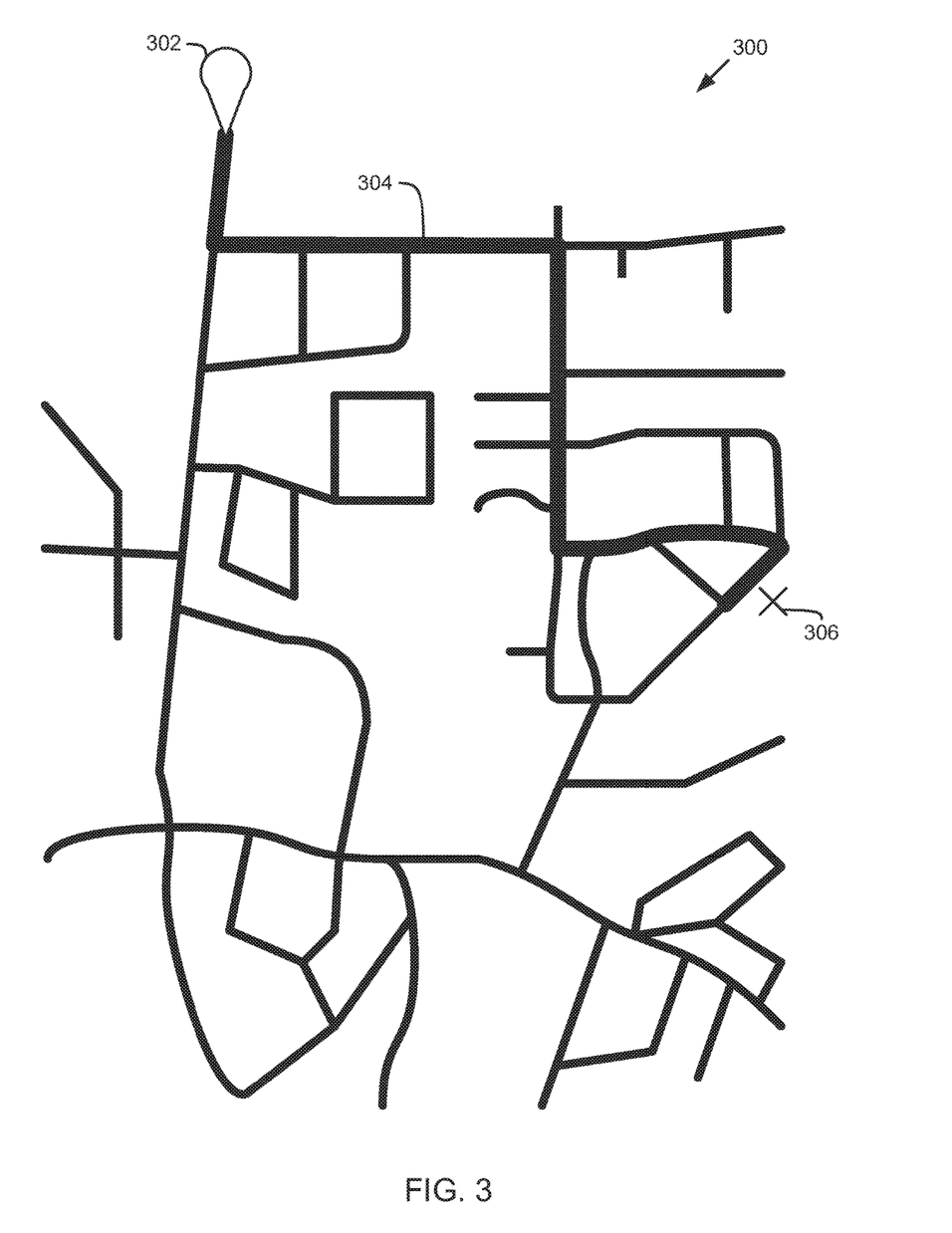
FIG. 3 illustrates a map of roadways near a current location of a vehicle, according to one implementation.

FIG. 3 illustrates a map 300 of roadways near a current location 302 of a vehicle. For example, the map 300 may illustrate roadways near the vehicle that are found in an electronic map accessible by the vehicle. The current location 302 of the vehicle may be obtained from a positioning system. For example, the vehicle may include a global navigation satellite system (GNSS) receiver, such as a Global Positioning System (GPS) receiver, Global Navigation Satellite System (GLONASS) receiver, Galilleo, or Beidou system mounted in the vehicle. Using the current location and/or any other available data, the path projection component 104 may determine or predict a destination and/or a most probable path for the vehicle. Example data that may be used to determine the most probable path includes vehicle or human drive history, time of day, current location, passenger or driver identity, day of the week, information from a navigation system (such as a destination or current route), or the like. A most probable path 304 and probable destination 306, which may be identified by the path projection component 104, is shown on the map 300. The path projection component 104 may further identify one or more less probable future driving paths.

In one embodiment, the path projection component 104 may obtain path attributes from a drive history, electronic map, ADASIS Horizon or attributed predicted path provider, or any other source for at least a portion of the most probable path 304. In an embodiment, the path projection component 104 further obtains path attributes for one or more less probable paths. For example, road geometry, speed limits, actual driving speeds of the vehicle or driver, previously detected obstacles or hazards, or the like may be determined and provided to a controller bus. This data may be used by the controllers and/or related applications to prepare for the path ahead and/or perform functions or tasks that benefit from having predicted or anticipatory data. It may be that the data provided by the path projection component 104 is not exactly accurate due to the possibility of changes since a map was created or since the last time the vehicle drove the route and gathered drive history data. However, this data may provide a good enough indication of what is to come so that the vehicle or driver can be prepared for the route.

Figure 4:
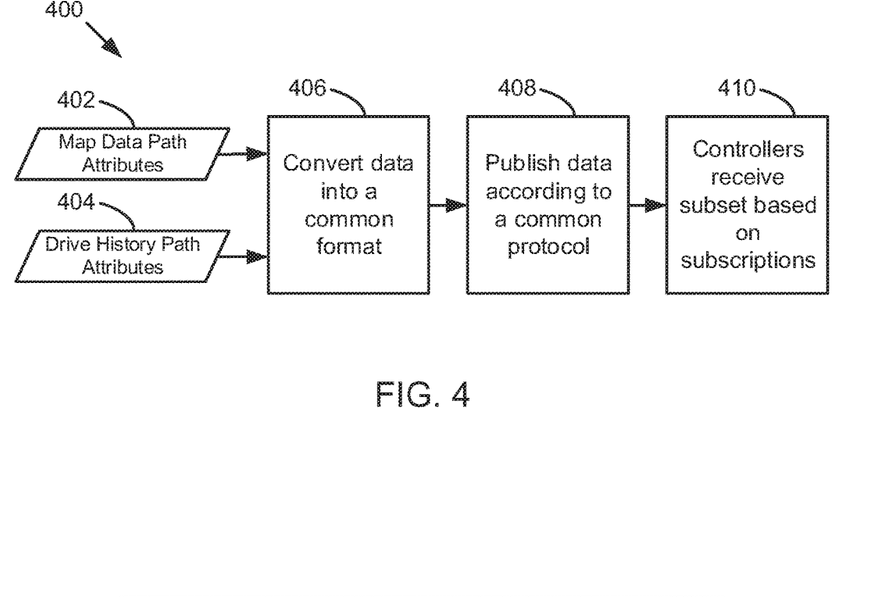
FIG. 4 is a schematic diagram illustrating a method for publishing data to a plurality of controllers, according to one implementation.

FIG. 4 is a schematic diagram illustrating a method 400 for publishing path attributes in a common format, according to one embodiment. The method 400 may be performed by a path projection component 104 and/or an automated driving/assistance system 102.

Figure 7:
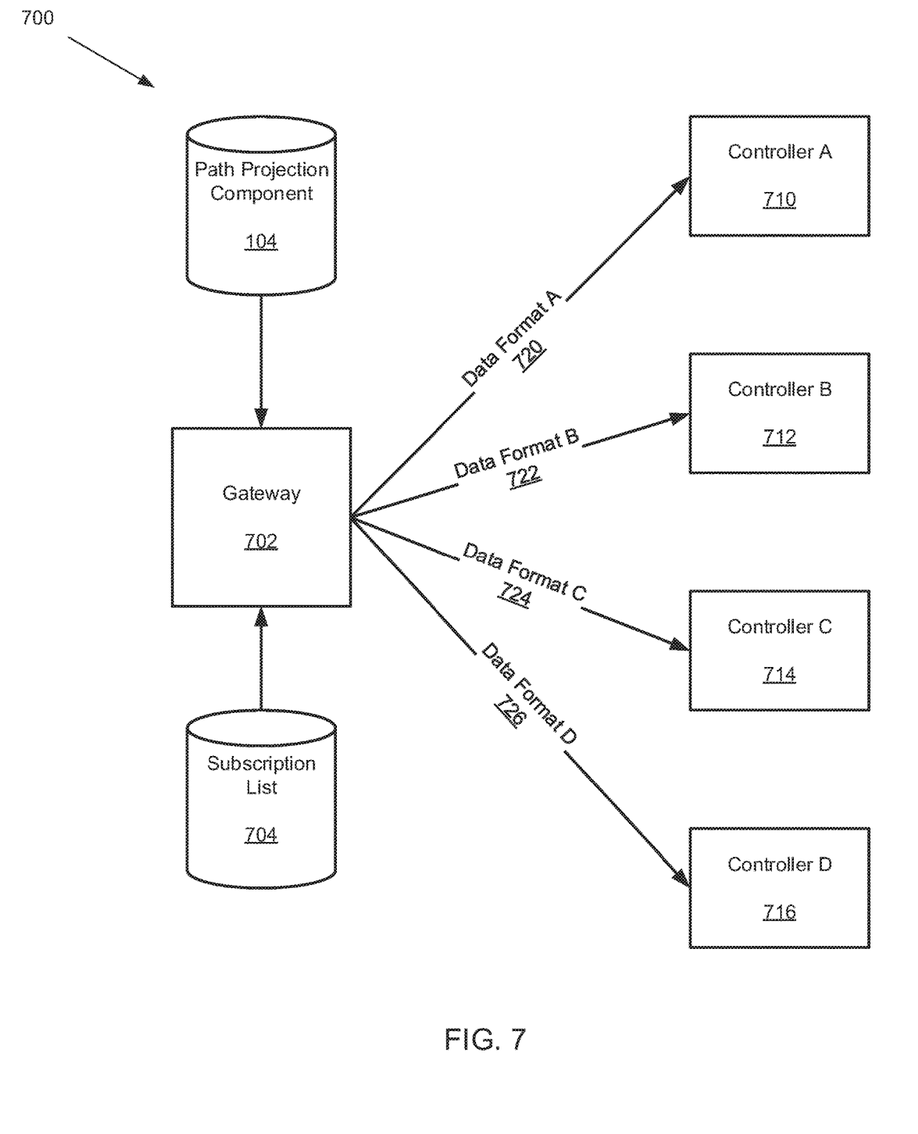
FIG. 7 is a schematic block diagram illustrating a drive history data message system, according to one implementation.

The method 400 begins and the path projection component 104 converts map data path attributes 402 and/or drive history path attributes 404 into a common format at 406. The map data path attributes 402 may be determined by the path projection component 104 and/or may be provided by an ADASIS Horizon or attributed predicted path provider. The drive history path attributes 404 may be determined by the path projection component 104 and/or may be provided by a drive history provider or data store. The path projection component 104 may convert at 406 the path attributes 402, 404 into a common format corresponding to a controller bus and any devices, systems, or controllers connected to the controller bus. In one embodiment, the common format may be common to the controller bus and/or all systems connected to the bus. Thus, only one version of data may need to be published to the controller bus and a plurality of messages carrying the same or similar data for different controllers may not be needed. In one embodiment, the path projection component 104 provides the common format to a gateway 702 (see FIG. 7), such that the gateway 702 may generate a message for a controller based on a subscription list 704. For example, the gateway 702 may be part of the controller bus 202 of FIG. 2. FIG. 7 illustrates a system 700 for providing customized subsets of drive history data to one or more controllers The path projection component 104 publishes at 408 the data in the common format according to a common protocol. For example, the common protocol may correspond to a protocol used by the controller bus. The path projection component 104 may publish at 408 the data by sending a message that includes any path attributes and/or an identifier or tag indicating the type of data in the message. At 410, one or more controllers receive a subset of the published data based on their subscriptions. For example, there may be different categories for data, which may be published on the controller bus, and some controllers may only need some subset of those data types. For example, each controller may provide a list of subscriptions to the controller bus and the controller bus may forward messages or data corresponding to the subscriptions, or may notify a controller that data corresponding to a subscription has been received. Thus, the controllers may receive at 410 only a subset of the data. Additionally, multiple controllers may receive the same data in the same format or protocol without requiring the path projection component 104 to send the data two or more times or in different formats. The controllers, after receiving the subset of data at 410, may reconstruct the data for use in the task or application that uses that data.

By providing data using a common protocol significant reduction in resource usage and development time for an automated driving/assistance system 102 may be achieved. For example, previously, a special protocol would have to be created for each application in each controller. However, with the common protocol, those devices that are configured to communicate over the CAN bus may be able to receive the path attributes and only one message may need to be sent and the data may be accessible by any controller connected to the CAN bus. These benefits may be available for automated driving systems or driver assistance systems. For example, human driven vehicles may be able to provide details or warnings about a path ahead to a human driver or provide intelligent cruise control functionality. As another example, automated vehicles may benefit from rich sensor data and reduced messaging and processing requirements of embodiments disclosed herein.

Further to the benefits of providing data using a common protocol, a centralized gateway 702 may generate a plurality of customized messages for a plurality of controllers using the data provided by the path projection component 104 in the common protocol. That is, the gateway 702 may communicate over the CAN and receive one message comprising path attributes from the drive history data that may be applicable to a variety of controllers. The gateway 702 may receive and store indications of a plurality of specialized subscriptions on a subscription list for a plurality of controllers. The gateway 702 may provide a plurality of customized messages to a plurality of controllers, such that each controller may receive only the data applicable to that controller and in the format, scaling, and units desired by the controller.

Figure 5:
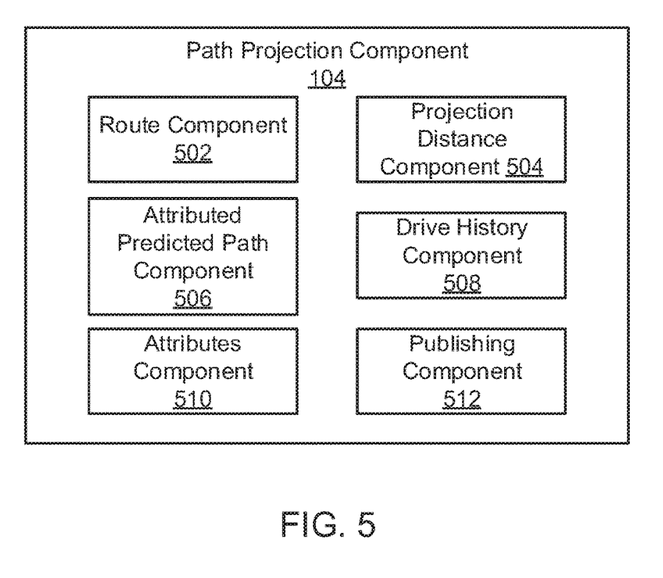
FIG. 5 is a schematic block diagram illustrating example components of a path projection component, according to one implementation.

FIG. 5 is a block diagram illustrating example components of a path projection component 104, according to one implementation. In the depicted embodiment, the path projection component 104 includes a route component 502, a projection distance component 504, an attributed predicted path component 506, a drive history component 508, an attributes component 510, and a publishing component 512. The components 502-512 are given by way of illustration only and may not all be included in all embodiments. In fact, some embodiments may include only one or any combination of two or more of the components 502-510. Furthermore, some of the components 502-510 may be located outside the path projection component 104, such as within an automated driving/assistance system 102, ADASIS Horizon or attributed predicted path provider, or drive history provider.

The route component 502 is configured to determine a route for a parent vehicle, such as a vehicle in which the path projection component 104 is located or installed. In one embodiment, the route component 502 may determine a most probable route or path for the vehicle based on available information. For example, the route component 502 may determine a likely destination and/or route based on the time of day, a drive history, a home location, a work location, a driver or passenger identity, or any other information. In one embodiment, the route component 502 may receive destination and/or route information from a navigation system. In one embodiment, the most probable route or path may match or vary slightly from the route or destination provided by the navigation system.

In one embodiment, the route component 502 may detect a variation from the predicted route (e.g., most probable route or path) and/or calculate or determine a new most probable path based on the variation. For example, if the predicted path is not correct and/or is not followed by the vehicle, the route component 502 may determine a new most probable route or path.

The projection distance component 504 is configured to determine a distance for which a path should be projected for the vehicle. In one embodiment, the distance is based upon a current speed or velocity of the vehicle. For example, the projection distance component 504 may select a larger projection distance if the vehicle is moving faster or has a route that extends along a route with a high speed limit. In one embodiment, the projection distance component 504 may determine a projection distance based on an amount of memory available to the path projection component 104. In one embodiment, the projection distance component 504 may determine a projection distance based on an amount of time it will take to travel a specific distance. For example, the projection distance may correspond to a distance it will take the vehicle to travel one minute, or any other time period, along a most probable path or route selected or identified by the route component 502.

The attributed predicted path component 506 is configured to determine map path attributes based on an electronic map. In one embodiment, the attributed predicted path component 506 determines the map path attributes by retrieving data about a roadway from an electronic map. For example, the attributed predicted path component 506 may retrieve details about road geometry, tilt, slope, curvature, or the like from an electronic map for a region between a current location of the vehicle and a location at a projection distance away from the vehicle. In one embodiment, the attributed predicted path component 506 receives the map path attributes or attributed predicted path attributes from an ADASIS Horizon or attributed predicted path provider separate or external from the path projection component 104. For example, the attributed predicted path component 506 may provide information about a region for which path attributes are needed to an ADASIS Horizon or attributed predicted path provider and receive the map path attributes from the ADASIS Horizon or attributed predicted path provider.

The drive history component 508 is configured to determine drive history path attributes based on a drive history. For example, the drive history may include data stored in a data store corresponding to roadways, routes, or paths previously traveled by the vehicle and/or a driver or passenger of the vehicles. In one embodiment, the drive history component 508 determines the drive history path attributes by retrieving data about a roadway from a drive history. For example, the attributed predicted path component 506 may retrieve details about road geometry, tilt, slope, curvature, hazards, or the like from a drive history for a region between a current location of the vehicle and a location at a projection distance away from the vehicle. In one embodiment, the information from a drive history may be more accurate and/or detailed than information provided by an ADASIS Horizon or attributed predicted path or electronic map because the data may correspond to data actually gathered and/or experienced by sensors of the vehicle. In one embodiment, the drive history component 508 receives the drive history attributes from drive history provider separate or external from the path projection component 104. For example, the drive history component 508 may provide information about a region for which path attributes are needed to a drive history provider and receive the drive history path attributes from the drive history provider.

The attributes component 510 is configured to determine one or more path attributes for a projected path. In one embodiment, the attributes component 510 determines the path attributes based on drive history path attributes provided by the drive history component 508 and/or map path attributes provided by the attributed predicted path component 506. At times, there may be no drive history for a current location or a predicted path of the vehicle and only ADASIS Horizon or attributed predicted path or map path attributes are available. In one embodiment, the attributes component 510 may determine data for a distance corresponding to a projection distance ahead of the vehicle's current location. As the vehicle travels the roadway, the attributes component 510 may gather or determine additional path attributes to maintain or provide path attributes for the projection distance ahead of the vehicle. For example, as the vehicle proceeds along a route additional path attributes for subsequent sections of roadway may be determined. In one embodiment, if a change in path is detected by the route component 502, the attributes component 510 may determine attributes for a new predicted or most probable route or path.

In one embodiment, the path attributes may also include path attributes for stubs, or possible side routes for the vehicle. For example, the path attributes may include path attributes not only along the most probable route or path identified by the route component 502, but also path attributes for any roadways that intersect with the most probable route or for separate less probable routes. This may provide sufficient information for a short distance until an alternate route can be calculated and additional path attributes or data can be obtained. In one embodiment, the path projection component 104 includes path attributes for a longer projected driving distance for the most probable route, and includes path attributes for a shorter projected driving distance for a less probable route.

In one embodiment, the attributes component 510 converts the path attributes into a common format. For example, the attributes component 510 may convert path attributes from different sources, such as from the attributed predicted path component 506 and/or the drive history component 508 into a common format that can be interpreted or used by all of the controllers on a controller bus. Thus, all controllers may be able to use the information obtained by the attributes component 510.

The publishing component 512 is configured to provide path attributes to a plurality of controllers or in an alternative embodiment, to provide path attributes to a gateway 702. In one embodiment, the publishing component 512 provides the path attributes to the controllers using a controller bus, such as a CAN bus. The publish component 512 may send one or more messages that publish path attributes for a section of the road ahead of the vehicle to the controller bus. The messages may be sent according to a common protocol so that controllers that need the same data can access the same message. For example, each controller does not require its own specific message in order to obtain needed path attributes. Rather this data is published to the controller bus and those controllers that need the data can access, receive, and/or retrieve that data. The common protocol may specify message types, data types, message formats, and/or data formats so that the data is communicated in a standardized manner than can be utilized by any controller on the bus.

In one embodiment, the publishing component 512 is configured to provide path attributes to a gateway 702 in a common protocol. The publishing component 512 may send one or more messages to the gateway 702 comprising path attributes from the drive history data for a most probable future driving path and/or a less probable future driving path. In such an embodiment, the gateway 702 may provide a plurality of customized messages to a plurality of controllers, and the controllers may not receive a message from the publishing component 512.

In one embodiment, one or more controllers on the bus may only end up receiving and/or using a subset of all the path attributes placed on the controller bus. For example, controller that suggests a speed to a human driver may not need every type of path attribute in order to determine and/or suggest a speed. In one embodiment, a controller may subscribe to a subset of data or certain types of path attributes. For example, the controller may provide a subscription list that indicates the types of path attributes that the controller would like to receive when that data is published to the bus or when the gateway 702 generates a message for the controller. The controller bus may store and manage a subscription list that indicates which controllers are subscribed to which types of messages or data. In response to receiving messages publishing path attributes to the controller bus, the controller bus or the gateway may compare the message type or data type to a subscription list and provide the message to the subscribed controllers. Thus, controllers may not need to process or receive every message on the controller bus and may simply use the data they need for reconstruction and/or use for the applications of the controller. In one embodiment, a system may have a single "provider" such as a gateway or a publishing component 512 and multiple reconstructors. The provider may act as a central database repository and each controller wishing to subscribe may act as a reconstructor. Data flows from the provider to the reconstructor and the individual controllers can ignore any undesired data.

In one embodiment, the publishing component 512 may continue to publish additional path attributes as the vehicle traverses a route and/or when the route changes. For example, if the route component 502 detects a departure from a predicted route, the publishing component 512 may obtain path attributes for a new route or path from the attributes component 510 and publish those path attributes for the new route or path to the controller bus or the gateway 702. Additionally, if the route changes, the publishing component 512 may send messages on the controller bus or the gateway 702 to indicate that previously sent data is or is not outdated and/or should be discarded. The controller bus and/or the gateway 702 may then discard the outdated or unneeded data and/or notify controllers of the change. The controllers may then be able to utilize data for the new route or path for their respective applications.

Figure 6:
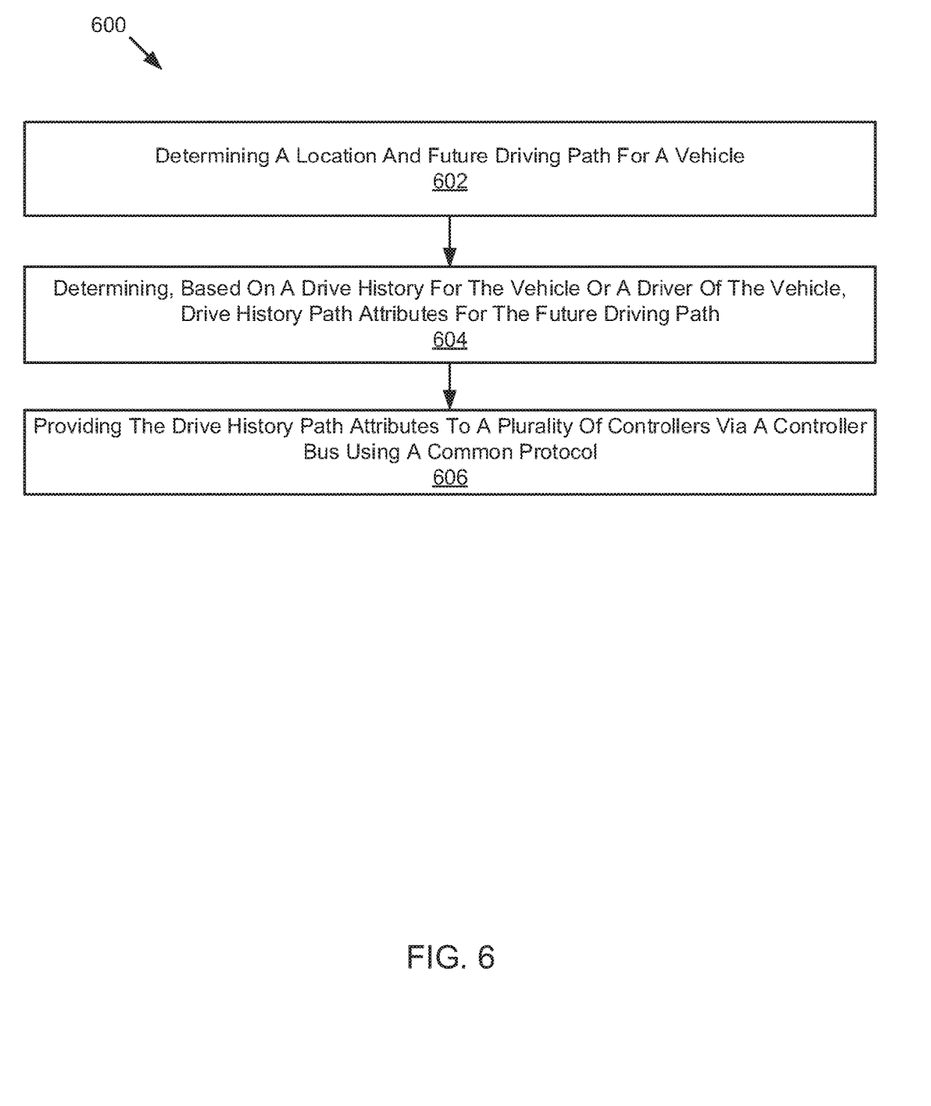
FIG. 6 is a schematic flow chart diagram illustrating a method for publishing path attributes to one or more controllers, according to one implementation.

Referring now to FIG. 6, a schematic flow chart diagram of a method 600 for providing path attributes is illustrated. The method 600 may be performed by a path projection component or an automated driving/assistance system, such as the path projection component 104 of FIG. 1, 2, or 5 or the automated driving/assistance system 102 of FIG. 1 or 2.

The method 600 begins and a route component 502 determines at 602 a location and a future driving path for a vehicle. For example, the route component 502 receives an indication of location from a GNSS receiver in the vehicle and may predict a destination and/or route the driver or vehicle will take to get to the destination from the current location. An attributes component 510 determines at 604, based on a drive history for the vehicle or a driver of the vehicle, drive history path attributes for the future driving path. The publishing component 512 provides at 606 the drive history path attributes to a plurality of controllers via a controller bus using a common protocol. For example, the drive history path attributes may be provided in a format and/or using a protocol that any controller on the controller bus that utilizes that type of path attribute (e.g., roadway geometry) is able to use and process the drive history path attributes.

FIG. 7 is a block diagram illustrating example components of a system 700 for providing customized subsets of drive history data to one or more controllers. The system 700 includes a gateway 702 receiving subscription data from a subscription list 704 and receiving drive history data from a path projection component 104.

The gateway 702 is configured to receive drive history data from the path projection component 104 in a first data format. In one embodiment the first format is the common protocol as received from the publishing component 512. In an alternative embodiment, the first format includes a plurality of varying formats for the plurality of path attributes. The drive history data includes path attributes for a future driving path of a vehicle. The gateway 702 is configured to generate a message for a controller comprising path attributes from the drive history data according to a subscription list 704. The message comprises a controller data format based on an indication in the subscription list 704. The gateway 702 is further configured to provide one or more data packets comprising the message to the controller.

FIG. 7 illustrates the gateway 702 providing a plurality of messages 720, 722, 724, 726 to a plurality of controllers 710, 712, 714, 716. The gateway 702 provides a message 720 comprising data format A to a controller A 710. The content of the message 720 includes a customized subset of path attributes from the drive history data for the future driving path. The message 720 is provided to the controller 710 in a data format applicable to the controller 710. Similarly for controller B 712, controller C 714, and controller D 716, the gateway 702 provides a message to each controller comprising path attributes from the drive history data applicable to the specific controller as indicated by the subscription list 704.

In an embodiment, a specific controller 710 requires only certain path attributes from the drive history data and does not require all of the drive history data. The subscription list 704 includes an indication of the certain path attributes required by the specific controller 710. Further, the specific controller 710 may require the path attributes in a particular data format readable by the controller 710. The subscription list 704 further includes an indication of a data format required or requested by the controller 710. Further, the specific controller 710 may require the path attributes to be scaled in a particular way or in a specific unit (e.g., meters vs feet or kilometers) expected by the controller 710. The subscription list 704 may further includes an indication of a scale, desired unit, or other value information required or requested by the controller 710. In an embodiment, the gateway 702 receives or looks up the indications in the subscription list 704 of (1) the particular path attributes from the drive history data required by each of a plurality of controllers; and (2) the particular data format, scale, and/or units required by each of a plurality of controllers. The gateway 702 may then prepare a customized message for each controller of a plurality of controllers based on the indications in the subscription list.

In an embodiment, the gateway 702 generates a message for each of a plurality of controllers. The message includes a customized subset of path attributes from the drive history data for the future driving path based on a subscription by the controller that is indicated in the subscription list 704. The message further includes a data format applicable to the controller as indicated by a subscription of the controller indicated in the subscription list 704. The gateway 702 further provides the message to the controller in one or more data packets.

In an embodiment, the gateway 702 provides a message comprising data format A 720 to a controller A 710. The gateway 702 further provides a message comprising data format B 722 to a controller B 712, a message comprising data format C 724 to a controller C 714, and a message comprising data format D 726 to a controller D 716, and so forth. In such an embodiment, each of the messages 720, 722, 724, 726 comprises a customized subset of path attributes from the drive history data that are applicable to the particular controller based on an indication in the subscription list 704. In an embodiment, one or more of the controller receives the same path attributes and/or the same data format. In an embodiment, each of the controllers receives a different path attribute or combination of path attributes and/or a different data format.

The subscription list 704 includes indications of the path attributes and data formats requested by a plurality of controllers. A single controller may not require each of the path attributes included in the drive history data, and may require only one more path attributes. Further, a single controller may require the data to be provided in a specific format including the specific units or scale for values. In an embodiment, the subscription list 704 is automatically populated by the plurality of controllers in the vehicle. Each controller may indicate a subscription in the subscription list including the path attributes requested by the controller and the data format requested by the controller. In an embodiment, a controller's subscription may be updated to reflect environmental changes or changes internal to the vehicle. In an embodiment, the subscription list 704 is populated by a user indicating the path attributes and data formats required by each of a plurality of controllers.

It should be appreciated that the gateway 702 may or may not transform the data format of the drive history data when generating the message. That is, the subscription list 704 may include an indication that the first data format received from the publish component 512 is the same controller data format requested by the controller as indicated in the subscription list 704. Alternatively, the gateway 702 may receive the drive history data in a first data format from the publish component 512 and may transform the first data format to a controller data format as indicated by a subscription by the controller in the subscription list.

In an embodiment, the gateway 702 receives drive history data for a plurality of possible future driving paths. The gateway 702 may receive an indication of a most probable future driving path and a plurality of less probable future driving paths. The gateway may receive an indication of a path projection distance along each of the possible future driving paths. The path projection distance may be longer for the most probable future driving path and it may be shorter for a less probable future driving path. In a further embodiment, the gateway 702 determines a path projection distance for each of a plurality of possible future driving paths based on the probability a particular driving path will be taken. The gateway 702 may generate a message for a controller comprising path attributes for a plurality of future driving paths, and may further comprise an indication of the most probable future driving path and the less probable future driving paths. In such an embodiment, the message may comprise data for a longer path projection distance along the most probable future driving path than for a less probable future driving path. The gateway 702 may provide the message in one or more packets to the controller. In an embodiment, the path attributes for two separate driving paths are not included in the same data packet.

It should be appreciated that the system may be performed in any suitable environment, including automotive Ethernet, CAN (Controller Area Network), and CAN-FD (Controller Area Network with Flexible Data-Rate). Automotive Ethernet and CAN-FD may permit higher bit rates per data packet. CAN-FD, for example, may permit up to ten times more data per data packet as a traditional CAN system. Ethernet may, for example, permit data transfer up to one-hundred times faster than a traditional CAN system and with a larger data payload. In the context of providing drive history data, this permits the system to transfer very rich information about the future driving path in advance. This may further permit the transfer of drive history data for a longer forward distance along a future driving path.

It should be appreciated that each data packet may comprise only the path attributes from the drive history data that are requested by the recipient controller, as indicated in the subscription list 704. This permits the system 700 to not adhere to a fixed data format and the gateway 702 may instead provide a controller with data in the data format requested by the controller. That is, the gateway 702 may meet the needs of a controller by providing only the requested data in the requested data format.

It should be appreciated that the system 700 provides a forward-looking transfer of data when using a gateway 702. The gateway 702 permits different data types to be transformed and utilized by older ECUs (Engine Control Units). The system 700 further provides for using higher bit rates for data transfer and permits the gateway 702 and the path projection component 104 to tag data. The system 700 permits writing a protocol 3 layer comprising enough information for rebuilding a database anywhere. For example, information within a packet may be "tagged" such that the meaning of the data or the corresponding path attribute is known based on the packet alone. In one embodiment, packets sent to a gateway 702 may include tagged data. In one embodiment, packets sent from the gateway to an ECU may be tagged. In one embodiment, because the information is tagged, the gateway or another system listening on a network or bus may be able to rebuild a drive history database, at least with respect to the data that was sent within messages.

The system 700 may include a common clock between various components of the system 700, wherein the components obey a transmit schedule providing a window of opportunity for communication based on the common clock. The communication may include larger data packets than traditional systems. The larger data packet may permit more info to be embedded with tags describing the payload in the message itself, rather than having the message be predefined.

Figure 8:
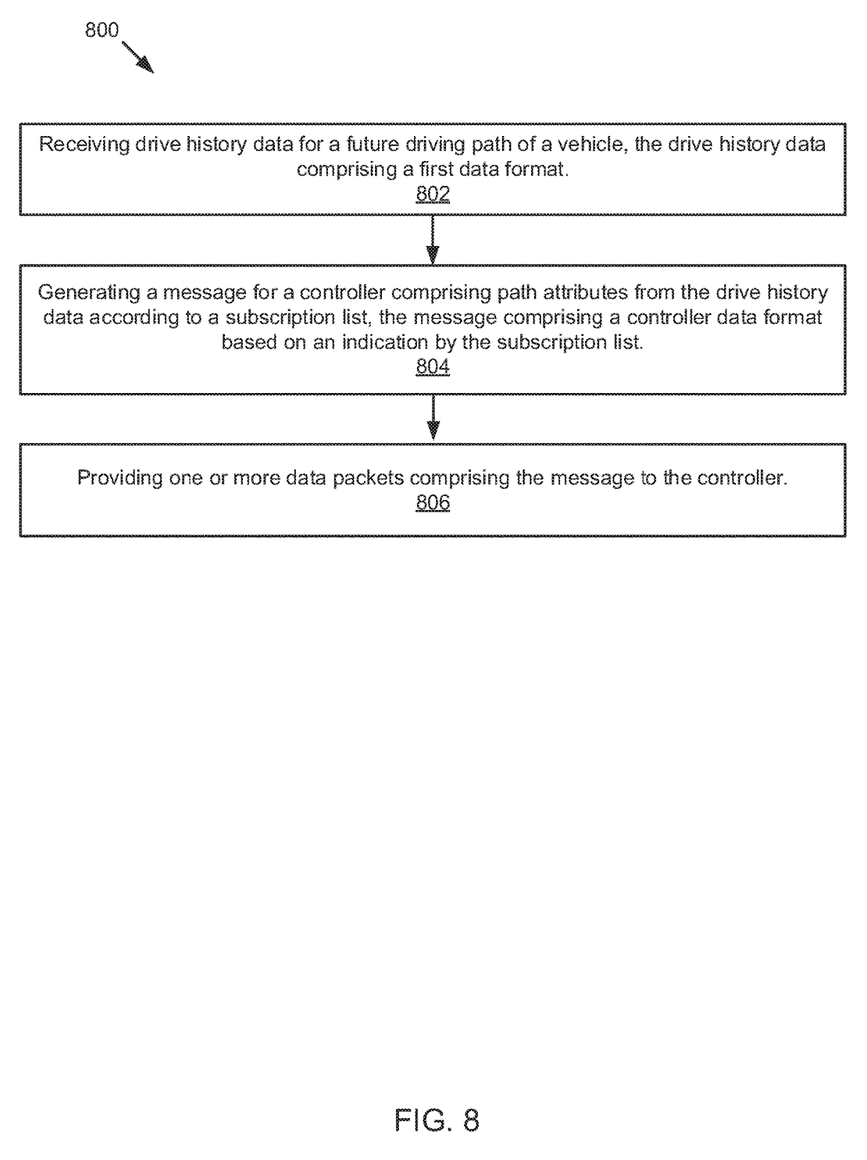
FIG. 8 is a schematic flow chart diagram illustrating a method for providing a customized message to one or more controllers, according to one implementation.

FIG. 8 illustrates a method 800 of providing a customized message to a controller. The method 800 begins and the gateway 702 receives drive history data for a future driving path of a vehicle, and the drive history data comprises a first data format 802. The gateway 702 generates a message for a controller comprising path attributes from the drive history data according to a subscription list 804. The message comprises a controller data format based on an indication by the subscription list. The gateway 702 provides one or more data packets comprising the message to the controller 806.

It should be understood that the method 800 may be repeated such that the gateway 702 generates a plurality of messages for a plurality of controllers. In an embodiment, the gateway 702 generates a second message for a second controller comprising path attributes from the drive history data according to the subscription list, the second message comprising a second controller format based on an indication by the subscription list. The gateway 702 further provides one or more data packets comprising the second message to the second controller.

Examples

The following examples pertain to further embodiments.

Example 1 is a method that may be performed by a gateway 702 or other device. The method includes receiving drive history data for a future driving path of a vehicle, the drive history data comprising a first data format. The method includes generating a message for a controller comprising path attributes from the drive history data according to a subscription list, wherein the message comprises a controller data format based on an indication by the subscription list. The method further includes providing one or more data packets comprising the message to the controller.

Example 2 is a method as in Example 1, wherein the message comprises a customized subset of path attributes from the drive history data applicable to a specific controller of a plurality of controllers, the customized subset of path attributes based on a subscription of the controller indicated in the subscription list.

Example 3 is a method as in any of Examples 1-2, wherein the subscription list comprises an indication of a subset of path attributes from the drive history data applicable to a specific controller based on a subscription of the specific controller.

Example 4 is a method as in any of Examples 1-3, wherein the subscription list comprises an indication of a data format applicable to a specific controller based on a subscription of the specific controller.

Example 5 is a method as in any of Examples 1-4, further comprising receiving drive history data for a plurality of possible future driving paths for the vehicle.

Example 6 is a method as in any of Examples 1-5, further comprising receiving an indication of a less probable future driving path for the vehicle; and generating an additional message for the controller comprising path attributes from the drive history data for the less probable future driving path based on the subscription list.

Example 7 is a method as in Example, wherein the message comprises drive history data corresponding to a path projection distance along the future driving path; the additional message comprises drive history data corresponding to a path projection distance along the less probable future driving path; and the path projection distance along the less probable future driving path is shorter than the path projection distance along the future driving path.

Example 8 is a method as in any of Examples 1-7, further comprising: detecting a departure from the future driving path to an alternate path; receiving drive history data for the alternate path; and in response to detecting the departure, generating an alternate message for the controller comprising path attributes from the drive history data for the alternate path based on the subscription list.

Example 9 is a method as in any of Examples 1-8, further comprising: generating a second message for a second controller comprising path attributes from the drive history data according to the subscription list, the second message comprising a second controller format based on an indication by the subscription list; and providing one or more data packets comprising the second message to the second controller.

Example 10 is a system. The system includes a controller bus, a controller in communication with the controller bus, a positioning system configured to determine a location of a vehicle, a route component configured to determine a driving path for the vehicle, a path projection component configured to determine and provide drive history data for the driving path in a first format, and a gateway. The gateway is configured to: receive the drive history data for the driving path from the path projection component in the first data format, generate a message for the controller comprising path attributes from the drive history data according to a subscription list, the message comprising a controller data format based on an indication by the subscription list, and provide one or more data packets comprising the message to the controller.

Example 11 is a system as in Example 10, wherein the message comprises a customized subset of path attributes from the drive history data applicable to a specific controller of a plurality of controllers, the customized subset of path attributes based on a subscription of the controller indicated in the subscription list.

Example 12 is a system as in any of Examples 10-11, wherein the subscription list comprises an indication of a subset of path attributes from the drive history data applicable to a specific controller based on a subscription of the specific controller.

Example 13 is a system as in any of Examples 10-12, wherein the subscription list comprises an indication of a data format applicable to a specific controller based on a subscription of the specific controller.

Example 14 is a system as in any of Examples 10-13, wherein the route component determines a plurality of possible future driving paths for the vehicle.

Example 15 is a system as in Example 14, wherein: the route component determines a less probable future driving path for the vehicle, and the gateway generates an additional message for the controller comprising path attributes from the drive history data for the less probable future driving path based on the subscription list.

Example 16 is a system as in Example 15, wherein: the message comprises drive history data corresponding to a path projection distance along the future driving path, the additional message comprises drive history data corresponding to a path projection distance along the less probable future driving path, and the path projection distance along the less probable future driving path is shorter than the path projection distance along the future driving path.

Example 17 is a system as in any of Examples 10-16, wherein: the gateway receives drive history data for an alternate path, and in response to detecting the departure, the gateway generates an alternate message for the controller comprising path attributes from the drive history data for the alternate path based on the subscription list.

Example 18 is a system as in any of Examples 10-17, wherein: the gateway is configured to generate a second message for a second controller comprising path attributes from the drive history data according to the subscription list, the second message comprising a second controller data format based on an indication by the subscription list. The gateway is further configured to provide one or more data packets comprising the second message to the second controller.

Example 19 is a system as in any of Examples 10-18, wherein the controller comprises one or more of an adaptive cruise control, an energy management controller, a curve warning controller, a headlight controller, a lane departure warning system, a hill power train optimization controller, a driver notification system, an automated driving system, and a driver assistance system.

Example 20 is a system comprising computer readable storage media storing instructions that, when executed by one or more processed, may cause the processors to conduct any of the steps as disclosed in Examples 1-19.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
receiving drive history data for a future driving path of a vehicle, the drive history data comprising a first data format;
generating a message for a vehicle controller comprising path attributes from the drive history data according to a subscription list, the message comprising a controller data format based on an indication by the subscription list; and
providing one or more data packets comprising the message to the vehicle controller.

2. The method of claim 1, wherein the message comprises a customized subset of path attributes from the drive history data applicable to a specific controller of a plurality of controllers, the customized subset of path attributes based on a subscription of the controller indicated in the subscription list.

3. The method of claim 1, wherein the subscription list comprises an indication of a subset of path attributes from the drive history data applicable to a specific controller based on a subscription of the specific controller.

4. The method of claim 1, wherein the subscription list comprises an indication of a data format applicable to a specific controller based on a subscription of the specific controller.

5. The method of claim 1, further comprising receiving drive history data for a plurality of possible future driving paths for the vehicle.

6. The method of claim 5, further comprising:
receiving an indication of a less probable future driving path for the vehicle; and
generating an additional message for the controller comprising path attributes from the drive history data for the less probable future driving path based on the subscription list.

7. The method of claim 6, wherein:
the message comprises drive history data corresponding to a path projection distance along the future driving path;
the additional message comprises drive history data corresponding to a path projection distance along the less probable future driving path; and
the path projection distance along the less probable future driving path is shorter than the path projection distance along the future driving path.

8. The method of claim 1, further comprising:
detecting a departure from the future driving path to an alternate path;
receiving drive history data for the alternate path; and
in response to detecting the departure, generating an alternate message for the controller comprising path attributes from the drive history data for the alternate path based on the subscription list.

9. The method of claim 1, further comprising:
generating a second message for a second controller comprising path attributes from the drive history data according to the subscription list, the second message comprising a second controller format based on an indication by the subscription list; and
providing one or more data packets comprising the second message to the second controller.

10. A system comprising:
a controller bus;
a vehicle controller in communication with the controller bus;
a positioning system configured to determine a location of a vehicle;
a route component configured to determine a driving path for the vehicle;
a path projection component configured to determine and provide drive history data for the driving path in a first data format; and
a gateway configured to:
receive the drive history data for the driving path from the path projection component in the first data format;
generate a message for the vehicle controller comprising path attributes from the drive history data according to a subscription list, the message comprising a controller data format based on an indication by the subscription list; and
provide one or more data packets comprising the message to the vehicle controller.

11. The system of claim 10, wherein the message comprises a customized subset of path attributes from the drive history data applicable to a specific controller of a plurality of controllers, the customized subset of path attributes based on a subscription of the controller indicated in the subscription list.

12. The system of claim 10, wherein the subscription list comprises an indication of a subset of path attributes from the drive history data applicable to a specific controller based on a subscription of the specific controller.

13. The system of claim 10, wherein the subscription list comprises an indication of a data format applicable to a specific controller based on a subscription of the specific controller.

14. The system of claim 10, wherein the route component determines a plurality of possible future driving paths for the vehicle.

15. The system of claim 14, wherein:
the route component determines a less probable future driving path for the vehicle; and
the gateway generates an additional message for the controller comprising path attributes from the drive history data for the less probable future driving path based on the subscription list.

16. The system of claim 15, wherein:
the message comprises drive history data corresponding to a path projection distance along the future driving path;
the additional message comprises drive history data corresponding to a path projection distance along the less probable future driving path; and
the path projection distance along the less probable future driving path is shorter than the path projection distance along the future driving path.

17. The system of claim 10, wherein:
the positioning system detects a departure from the driving path;
the gateway receives drive history data for an alternate path; and
in response to detecting the departure in the driving path, the gateway generates an alternate message for the controller comprising path attributes from the drive history data for the alternate path based on the subscription list.

18. The system of claim 10, wherein:
the gateway is configured to generate a second message for a second controller comprising path attributes from the drive history data according to the subscription list, the second message comprising a second controller data format based on an indication by the subscription list; and the gateway is configured to provide one or more data packets comprising the second message to the second controller.

19. The system of claim 10, wherein the controller comprises one or more of an adaptive cruise control, an energy management controller, a curve warning controller, a headlight controller, a lane departure warning system, a hill power train optimization controller, a driver notification system, an automated driving system, and a driver assistance system.

20. Computer readable storage media storing instructions that, when executed by one or more processors, cause the one or more processors to:

determine a location of a vehicle;

determine a future driving path for the vehicle;

determine, based on a drive history of the vehicle, drive history data for the future driving path;

generate a message for a vehicle controller comprising path attributes from the drive history data according to a subscription of the vehicle controller indicated in a subscription list; and provide one or more data packets comprising the message to the vehicle controller.

* * * * *